J. H. ARTMAN & A. J. BRUGGEMAN.
HOG TROUGH.
APPLICATION FILED JUNE 17, 1912.
1,066,975.
Patented July 8, 1913.
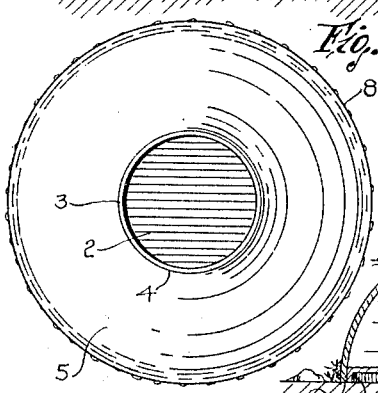
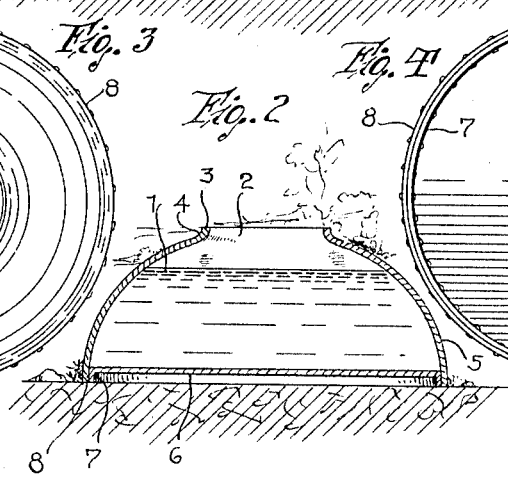
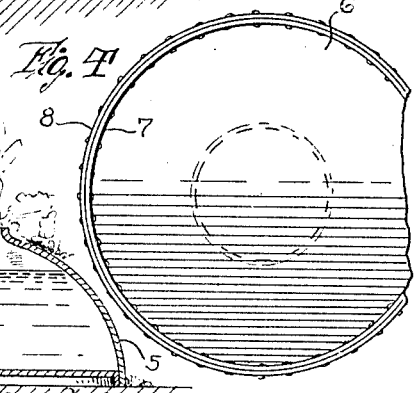
Inventors
Adolph J. Bruggeman
Joseph H. Artman
Witnesses
Robert M. Sutphen
Jno. L. McCarthran
By E. E. Vrooman
Their Attorney

UNITED STATES PATENT OFFICE.

JOSEPH H. ARTMAN AND ADOLPH J. BRUGGEMAN, OF LAUREL, NEBRASKA.

HOG-TROUGH.

1,066,975.  Specification of Letters Patent.  Patented July 8, 1913.

Application filed June 17, 1912. Serial No. 704,137.

*To all whom it may concern:*

Be it known that we, JOSEPH H. ARTMAN and ADOLPH J. BRUGGEMAN, citizens of the United States, residing at Laurel, in the county of Cedar and State of Nebraska, have invented certain new and useful Improvements in Hog-Troughs, of which the following is a specification, reference being had therein to the accompanying drawing.

This invention relates to hog troughs or animal watering troughs, and has for its object the production of a simple and efficient trough which is provided with a broad flat base, for the purpose of preventing the trough from being accidentally tipped over and spilling the water out of the same.

Another object of this invention is the production of a simple and efficient trough, the sides of which are so formed as to make it impossible for the hog or other animals to step upon the same, which would be likely to tip over the trough.

With these and other objects in view, this invention consists of certain novel constructions, combinations, and arrangements of parts, as will be hereinafter fully described and claimed.

In the drawings: Figure 1 is a side elevation of the trough showing the same in actual operation. Fig. 2 is a central sectional view of the trough. Fig. 3 is a top plan view of the trough. Fig. 4 is a bottom plan view of the trough.

By referring to the drawings it will be seen that 1 designates the body which is provided with an opening 2 near its upper end, the sides of the opening being bent upwardly to form an upstanding flange 3. The sides of the flange merge into the sides of the body 1, as indicated at 4, in Fig. 2. The sides of the trough are rounded as illustrated at 5 in such a manner as to cause the trough to have a wide base. The trough 1 is provided with a bottom 6 which bottom is secured to the sides of the trough by means of the flange portion 7, and it will, therefore, be seen that by having the bottom 6 placed above the bottom edge of the sides, as illustrated in Fig. 2, an efficient means has been produced for gripping the ground upon which the trough is placed which will prevent the trough from being slid around from place to place. In other words, this edge, as indicated at 8, will constitute an anchoring means for holding the trough in place.

By carefully considering Fig. 1, it will be seen that as the hog jumps or steps upon the side of the trough his feet will slip downwardly as indicated in dotted lines at 9, thereby preventing the animal from placing his feet in the trough and allowing the trough to be lifted up in this manner. Furthermore, it will be seen that the small animals by the use of the present device will be prevented from climbing up into the trough, as the sides will be so formed as to be very slippery, and which will prevent the climbing of the animals upon the trough.

It should be understood that the trough may be formed of sheet metal or other convenient material, and that water within the trough will assist the trough in keeping its position and prevent the same from being tipped over as the water will constitute an efficient weight and anchorage for holding the trough in place.

What is claimed is:—

A trough of the character described comprising a semi-spherical body having an opening in its top that is surrounded by an annular upstanding guard flange, and a bottom fitting in the lower end of the body and having its periphery downturned to provide a flange that snugly fits within and is rigidly fastened to the lower edge of the body, said flange and the lower edge of the body forming a ground-engaging anchor for the trough.

In testimony whereof we hereunto affix our signatures in presence of two witnesses.

JOSEPH H. ARTMAN.
ADOLPH J. BRUGGEMAN.

Witnesses:
  B. H. BELL,
  F. P. VOTER.